United States Patent [19]

Sata et al.

[11] 4,336,066

[45] Jun. 22, 1982

[54] METHOD FOR MANUFACTURING COMPONENTS FOR MAGNETIC HEADS OF INCREASED ABRASION RESISTANCE

[75] Inventors: Takeo Sata; Masayuki Takamura; Kenzaburo Iijima; Norio Fukuda, all of Hamamatsu, Japan

[73] Assignee: Nippon Gakki Seizo Kabushiki Kaisha, Japan

[21] Appl. No.: 152,782

[22] Filed: May 23, 1980

[30] Foreign Application Priority Data

May 25, 1979 [JP] Japan .................................. 54-64819
Jul. 31, 1979 [JP] Japan .................................. 54-98317
Aug. 1, 1979 [JP] Japan .................................. 54-98555
Dec. 10, 1979 [JP] Japan .................................. 54-159092

[51] Int. Cl.³ ........................... B22F 1/00; B22F 1/02; C22C 19/03; C22C 33/02
[52] U.S. Cl. .......................................... 75/211; 29/609; 75/0.5 BA; 75/0.5 C; 75/206; 75/212; 75/214; 75/224; 75/225; 148/126; 360/126; 428/900; 428/928
[58] Field of Search ............. 428/928, 900; 75/0.5 C, 75/0.5 BA, 211, 206, 212; 148/126, 105, 31.55, 120, 104; 360/126, 125; 29/609

[56] References Cited

U.S. PATENT DOCUMENTS

| | | | |
|---|---|---|---|
| 3,728,111 | 4/1973 | Stromblad et al. | 75/211 X |
| 3,814,598 | 6/1974 | Gabriel | 75/206 |
| 4,029,475 | 6/1977 | Hamai et al. | 75/211 X |
| 4,029,501 | 6/1977 | Moss | 75/206 |
| 4,209,326 | 6/1980 | Klein | 75/211 |

FOREIGN PATENT DOCUMENTS 576160 10/1977 U.S.S.R. ................................ 75/206

*Primary Examiner*—Helen M. McCarthy
*Attorney, Agent, or Firm*—Ostrolenk, Faber, Gerb & Soffen

[57] ABSTRACT

In manufacturing of lamina used for components for magnetic heads such as head cores and shield casings, powder metallurgy is applied to powder material of a permalloy alloy composition in combination with later-staged rolling. Addition of at least one easily oxidizable element is preferably combined with formation of the material powder by means of atomization, more preferably followed by annealing within a reducing atmosphere. Measured formation of oxidized shells on powder particles assists uniform and smooth dispersion of smashed shell flakes into the lamina, thereby greatly raising abrasion resistance of the product without lowering the magnetic properties.

20 Claims, 17 Drawing Figures

METHOD FOR MANUFACTURING COMPONENTS FOR MAGNETIC HEADS OF INCREASED ABRASION RESISTANCE

The present invention relates to a method for manufacturing components for magnetic heads, and more particularly relates to improvements in the method for manufacturing components such as a core and a shield casing for magnetic heads used for magnetic sound or video recording and reproducing.

The material used for the above-described components is in general required to have, in addition to high magnetic properties, high mechanical properties, in particular high abrasion resistance since they are usually subjected to hard and frequent frictional contact with running magnetic tapes.

Permalloy alloys are conventionally and generally used for such components but unable to sufficiently suffice such requirement for high abrasion resistance, thereby causing relatively low durability of these components for magnetic heads. It is proposed to add a particular element or elements to permalloy alloys. Such addition, however, is still unable to raise abrasion resistance of the component to an appreciable extent, and liable to lower magnetic characteristics of the product. It is proposed also to add a hard material or materials such as metal oxide to permalloy alloy. This addition, however, is accompanied with difficulty in uniform dispersion of the added material into the base alloy even in molten state. Biased presence of the added material in the base alloy naturally causes biased mechanical and/or magnetic properties of the product.

In view of the above-described state of the art, the inventors of the present invention has tried to greatly raise abrasion resistance of the components used for magnetic heads by improving their manufacturing method.

In conventional manufacturing of a laminated head core, for example, a cast block is reformed into laminae by rolling. Basically, the present invention proposes to introduce the art of powder metallurgy into the above-described manufacturing in order to obtain permalloy alloy blocks to be subsequently subjected to rolling. It is admitted that mere manufacturing of permalloy alloy block by powder metallurgy itself is an established art well known to public. However, permalloy alloy blocks manufactured by powder metallurgy only have very poor abrasion resistance. Further, presence of numerous fine air voids in the block disables easy application of fine cutting to the block and deteriorates magnetic properties of the product.

It is the basic object of the present invention to provide a method for manufacturing components for magnetic heads which have, in addition to high magnetic properties, sufficient mechanical properties, in particular high abrasion resistance.

In accordance with the basic aspect of the present invention, material powder is blended so as to substantially have a permalloy alloy composition, the blended material powder is subjected to compaction to obtain a compressed block, and the compressed block is subjected to rolling after application of sintering.

In more detail, blending of the material powder is carried out by mixing Fe powder with Ni powder. As a substitute, Fe-Ni alloy powder may be used as the base material with addition of a proper material or materials for improving any property of the product.

So-called 78 permalloy may be used for the permalloy alloy in the present invention. 78-permalloy includes, as the base material, a mixture of 60 to 90% by weight of Ni with 5 to 20% by weight of Fe. In addition to the base material, it may include, depending on requirement in use of the product, at least one of 0.5 to 14% by weight of Mo, 0.1 to 20% by weight of Cu, 0.1 to 10% by weight of Cr, 0.1 to 15% by weight of Nb, 0.1 to 10% by weight of Ti, 0.1 to 8% by weight of V, 0.1 to 8% by weight of Si, 0.01 to 5% by weight of Al, 0.1 to 8% by weight of W, 0.1 to 15% by weight of Ta, 0.01 to 15% by weight of Mn, 0.1 to 5% by weight of Co, 0.005 to 5% by weight of Y, 0.005 to 5% by weight of Ce, 0.005 to 5% by weight of La and 0.005 to 5% by weight of Sm.

So-called 45-permalloy may be usable also, which includes, as the base material, a mixture of 35 to 55% by weight of Ni, with 35 to 55% by weight of Fe, and, as the additive, at least one of the above-described materials.

After complete blending, the material powder is placed, for example, in a rubber casing for compaction by, for example, hydrostatic compaction. When hydrostatic compaction is employed, the compaction pressure should preferably be in a range from 4,000 to 20,000 kg/cm$^2$ and the compaction time in a range from 2 to 300 sec.

The compressed block obtained by the compaction is then subjected to high temperature sintering within a vacuum, reducing gas or inert gas atmosphere.

In the case of sintering within a vacuum atmosphere, the degree of vacuum should preferably be 10$^{-2}$ Torr or lower. Any degree of vacuum above limit tends to cause oxidation of the material powder, thereby deteriorating magnetic properties of the product.

In the case of sintering within a reducing or inert gas atmosphere, the dew point of the gas should preferably be $-20°$ C. or lower. Any dew point exceeding this value may also cause oxidation of the material powder, thereby lowering magnetic properties of the product.

The sintering temperature should preferably be in a range from 900° to 1,430° C. No effective sintering starts at a temperature below 900° C. whereas any temperature above 1.430° C. may cause melting of the material powder.

The sintering time should preferably be in a range from 1 to 20 hours. No sufficient sintering effect is obtained when heating lasts shorter than 1 hour whereas no remarkable rise in sintering effect is expected when heating time exceeds 20 hours.

Finally, the sintered block is rolled into a lamina of, for example, about 0.3 mm thickness. This rolling preferably includes alternate application of 30 to 70% of cold rollings and annealings at 750° to 850° C.

The lamina so obtained is then cut into laminae of a prescribed pattern. In the case of a laminated head core, such laminae are superposed upon each other and bonded together by suitable resin. In the case of a shield casing, the lamina is subjected to pressure shaping.

In the case of the method of the basic aspect of the present invention, permalloy powder metallurgy is used in combination with the later-staged rolling, thereby successfully raising abrasion resistance of the product. This success accrues from the fact that application of the rolling smashes hard oxidized shells formed on powder particles during the initial blending, compaction and sintering and the smashed pieces disperse uniformly into the body of the rolled lamina.

That is, the first aspect of the present invention tactfully makes use of formation of oxidized shells on powder particles during processes preceding the final rolling. It has been confirmed, however, by the inventors of the present invention, that one cannot always expect sufficient and constant formation of such oxidized shells during manufacturing of the sintered blocks. Consequently, the method of the basic aspect of the present invention cannot always assure successful provision of sufficiently high abrasion resistance.

It is another object of the present invention to enable constant manufacturing of permalloy components for magnetic heads with sufficiently high abrasion resistance.

In accordance with another aspect of the present invention, an easily oxidizable element or elements are added to the base material for permalloy alloy, i.e. mixture of Fe with Ni, and preparation of the material powder includes atomization. Like the method of the basic aspect, the blended material powder is then subjected to compaction, sintering and rolling.

In more detail, the above-described easily oxidizable element or elements are chosen from a group consisting of Al, Ti, Mg, Ca, Ce and Be. The base material of permalloy alloy composition and the easily oxidizable element or elements are blended together by atomization in order to cause formation of oxidized shells on the powder particles. In particular, it was confirmed that remarkable effect can be obtained when Al, Ti, Mg and/or Ca is added to the base material.

The preferable contents for the above-described easily oxidizable elements are as follows;
Al: 0.005 to 2% by weight
Ti: 0.005 to 1.5% by weight
Mg: 0.01 to 2% by weight
Ca: 0.01 to 2% by weight
Ce: 0.005 to 1.0% by weight
Be: 0.001 to 1.0% by weight When the content of an added element falls short of its lower limit, no sufficient rise in abrasion resistance of the resultant product can be expected. The content of an added element exceeding its upper limit tends to lower magnetic properties of the product obtained. When two or more easily oxidizable elements are used in combination, the total content of such elements should preferably be in a range from 0.005 to 2.0% by weight.

In addition to the above-described easily oxidizable elements, the material powder may contain elements listed in connection with the basic aspect of the present invention.

It is necessary in this aspect of the present invention that at least the material powder containing the easily oxidizable element or elements is prepared by atomization. That is, when only alloy powder having the ultimate composition is used as the base material powder, the molten alloy has to be powdered by atomization. When a part of the ultimate composition is used as the master alloy containing the easily oxidizable element or elements and each remnant is added individually, at least the master alloy has to be powdered by atomization. Further, when any single easily oxidizable element is added, at least the element has to be powdered by atomization.

The atomization used for the present invention may take the form of hydro-atomization in which a substance in molten state is powdered by jet flow of water. It may further take the form of gas-atomization in which a substance in molten state is powdered by flow of compressed gas such as air. A great deal of oxidized shells are formed on the powder particles by use of atomization in blending of the material powder containing easily oxidizable element or elements.

During the last staged rolling, the shells on the powder particles are smashed into fine pieces which then disperse uniformly into the body of the rolled lamina. Concurrently, fine air voids in the sintered block disappear. Such a combined effect greatly raises abrasion resistance of the product.

In the case of the above-described aspect of the present invention, at least one easily oxidizable element is added to the material powder and atomization is used for preparation of the material powder. Use of atomization, however, has its merits with demerits. That is, presence of the oxidized shells on powder particles blocks smooth dispersion of the powder particles and lowers inter-particle bonding. Low inter-particle bond may cause separation of particles from the product depending on the strength of the frictional contact, thereby deteriorating abrasion resistance of the product.

It is the other object of the present invention to provide a method for fortifying the inter-particle bond of the product whilst allowing formation of the oxidized shells on powder particles in preparation of the material powder for components used for magnetic heads.

Thus, in accordance with the other aspect of the present invention, the material powder including at least one easily oxidizable element is subjected to annealing within a reducing atmosphere after preparation including atomization. By this annealing, oxides of easily reducible elements such as Fe and Ni contained in the material powder are reduced in advance of the compaction, sintering and rolling, The above-described reducing atmosphere should preferably be either hydrogen reducing atmosphere having a dew point of $-30°$ C. or lower or vacuum atmosphere of $10^{-2}$ Torr or higher. The annealing temperature should preferably be in a range from 200° to 800° C. The annealing time should preferably be in a range from 0.5 to 20 hours.

No sufficient reduction is obtained when annealing is carried out within a hydrogen reducing atmosphere having a dew point higher than $-30°$ C. or a vacuum atmosphere lower than $10^{-2}$ Torr. No reduction starts at any temperature lower than 200° C. whereas sintering starts during annealing when the temperature exceeds 800° C. No sufficient reduction can be completed within 0.5 hours whereas no further development in reduction can be expected even when annealing lasts longer than 20 hours.

Due to such reduction during annealing, oxides formed on the powder particles by atomization are partly reduced. That is, among the oxides in the oxidized shells, those originated from easily oxidizable elements such as Al remain almost unchanged during the annealing. In contrast to this, those originated from easily reducible elements such as Ni and Fe are reduced to their original elements during the annealing.

During the sintering to be carried out after the compaction of the material powder, presence of the reduced elements such as Ni and Fe on the powder particles enables smooth inter-particle dispersion, thereby producing sintered blocks with high inter-particle bond.

Such a high inter-particle bond well prevents undesirable fall of particles from the products which is otherwise caused by frictional contact with running tapes.

The invention will hereinafter be explained in more detail in reference to the accompanying drawings, in which FIG. 1 is a top view of a magnetic head core test piece used for measurement of abrasion resistance in the following examples of the present invention.

The following examples are illustrative of the present invention but not to be construed as limiting the same.

EXAMPLE 1

Following powders were selectively used for preparation of the material powder;

Fe—Carbonyl iron powder
Ni—Carbonyl nickel powder
Mo—Molybdenum powder
Cu—Electrolytic copper powder
Cr—Electrolytic chromium powder
Nb—Nickel-niobium alloy powder
Ti—Titanium halide powder
V—Ferro-vanadium alloy powder
Si—Ferro-silicon alloy powder
Al—Ferror-alluminum alloy powder
W—Ferro-tungsten alloy powder
Ta—Nickel-tantalum alloy powder
Mn—Ferro-manganese alloy powder
Co—Electrolytic cobalt powder Using these powders, eight material powder samples No. 1 to No. 8 of different compositions were prepared as shown in Table 1.

TABLE 1

| Sample No | | Composition (in % by weight) | | | | | | | |
|---|---|---|---|---|---|---|---|---|---|
| INVENTION | CONVENTIONAL | Ni | Fe | Mo | Cu | Nb | Ti | Si | Cr |
| 1 (17) | 9 | 79.0 | 16.5 | 4.5 | | | | | |
| 2 (18) | 10 | 78.5 | 13.0 | 4.0 | 5.0 | | | | |
| 3 (19) | 11 | 81.5 | 10.0 | 1.5 | | 7.0 | | | |
| 4 (20) | 12 | 83.0 | 12.0 | | | | 3.0 | 2.0 | |
| 5 (21) | 13 | 84.0 | 11.8 | | | | | | 4.2 |
| 6 (22) | 14 | 50.0 | 50.0 | | | | | | |

TABLE 1-continued

| Sample No | | Composition (in % by weight) | | | | | | | |
|---|---|---|---|---|---|---|---|---|---|
| INVENTION | CONVENTIONAL | Ni | Fe | Mo | Cu | Nb | Ti | Si | Cr |
| 7 (23) | 15 | 45.0 | 53.0 | 2.0 | | | | | 10.0 |
| 8 (24) | 16 | 39.0 | 51.0 | | | | | | |

Each material powder sample was mixed from 0.5 to 4 hours within a V-type mixer and placed within a rubber container for hydrostatic compaction at 15.000 kg/cm² for about 200 sec. A compressed block of 50×50×100 mm. was obtained. The compressed block was then sintered at 1,300° C. for about 15 hours within a vacuum atmosphere of $10^{-2}$ Torr. or lower. The sintered block was subjected to alternate application of cold rolling of 50% and interim annealing at 800° C. for 2 hours until a lamina of 0.3 mm was obtained.

An O-ring shaped test piece was stamped out of the permalloy alloy lamina. The outer diameter was 10 mm, and the inner diameter was 6 mm. The test piece was subjected to annealing at 1,100° C. for 2 hours within a hydrogen atmosphere. Magnetic properties and hardness of the resultant test piece were measured.

Figure 1:
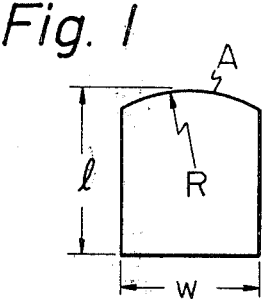
Figure 2:
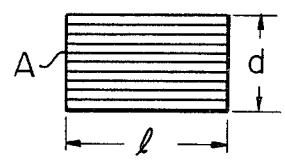
FIG. 2 is a side view of the above-described test piece.

Separately, a number of pieces of the pattern shown in FIG. 1 were stamped out of the above-described permalloy alloy lamina, the pattern being to the transverse cross sectional profile of an ordinary magnetic head core. 25 sheets of pieces were superposed and bonded together by means of suitable resin in order to obtain a magnetic head core test piece such as shown in FIG. 2. The dimension of this test piece was as follows:

| | | |
|---|---|---|
| Length | | $l = 11.5$ mm. |
| Width | | $w = 10$ mm. |
| Radius of curvature of the tape contacting face A | | $R = 10$ mm. |
| Thickness | | $d = 7$ mm. |

Figure 3:
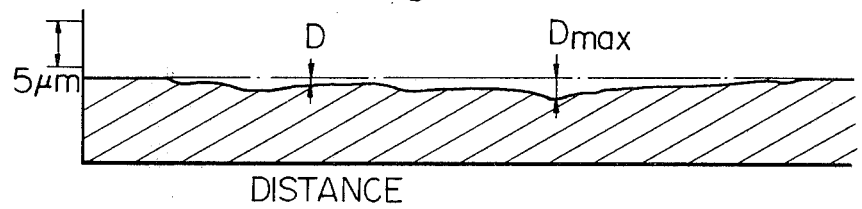
FIG. 3 is a side sectional view of the tape contacting face of the sample No. 1 (present invention) in Example 1.

In the abrasion test, the test piece was mounted t auto-reverse type cassette deck and a gamma hem tape was used, which is generally known to cause mum abrasion. Running of the tape was continue 100 hours and the maximum value Dmax of the ab depth D in the tape contacting face A of the test was measued. The abrasion test was carried out atmosphere of 20°±2° C. temperature and 40 t humidity. The results of the measurements are sh Table 2. Abrasion in the tape contacting face A test piece No. 1 is shown in FIG. 3.

TABLE 2

| Sample NO. | Magnetic properties | | | Hardness (Hv) | Maximum abrasion depth D$_{max}$ (μm) | cate |
|---|---|---|---|---|---|---|
| | Initial magnetic permeability (μ$_o$) | Coercive force Hc (A/m) | Saturated magnetic flux density B$_{10}$ (T) | | | |
| 1 | 70,000 | 1.2 | 0.76 | 156 | 1.2 | pres |
| 2 | 80,000 | 1.6 | 0.70 | 132 | 1.9 | inv |
| 3 | 100,000 | 0.8 | 0.60 | 205 | 0.2 | |
| 4 | 50,000 | 2.0 | 0.57 | 220 | 0.2 | |
| 5 | 45,000 | 2.0 | 0.55 | 220 | 0.35 | |
| 6 | 2,500 | 8 | 1.40 | 130 | 0.8 | |
| 7 | 5,000 | 6.0 | 1.35 | 140 | 0.4 | |
| 8 | 2,500 | 6.8 | 0.55 | 130 | 0.3 | |
| 9 | 90,000 | 0.88 | 0.76 | 140 | 13 | c |
| 10 | 70,000 | 1.44 | 0.71 | 115 | 20 | |
| 11 | 120,000 | 0.64 | 0.61 | 192 | 3 | |
| 12 | 60,000 | 1.6 | 0.58 | 210 | 2.5 | |
| 13 | 40,000 | 2.48 | 0.53 | 208 | 4.5 | |

TABLE 2-continued

| Sample NO. | Initial magnetic permeability ($\mu_o$) | Coercive force Hc (A/m) | Saturated magnetic flux density $B_{10}$ (T) | Hardness (Hv) | Maximum abrasion depth $D_{max}$ ($\mu m$) | category |
|---|---|---|---|---|---|---|
| 14 | 2,000 | 8 | 1.40 | 110 | 12 | |
| 15 | 5,000 | 6.4 | 1.35 | 120 | 9 | |
| 16 | 3,000 | 6.4 | 0.55 | 115 | 6 | |

EXAMPLE 2

Permalloy alloy powder prepared by carbonyl process was used as the base material while including 75% by weight of Ni and remaining amount of Fe. Carbonyl iron powder and carbonyl nickel powder were added to this base material. Further materials were added in order to obtain eight material powder samples No. 17 to 24 as shown in Table 1. Each material powder sample was subjected to compaction, sintering and rolling in order to obtain a permalloy lamina under conditions same as those employed in Example 1. The test piece so obtained were subjected to measurements of magnetic properties, hardness and abrasion resistance. Results are shown in Table 3.

Figure 4:
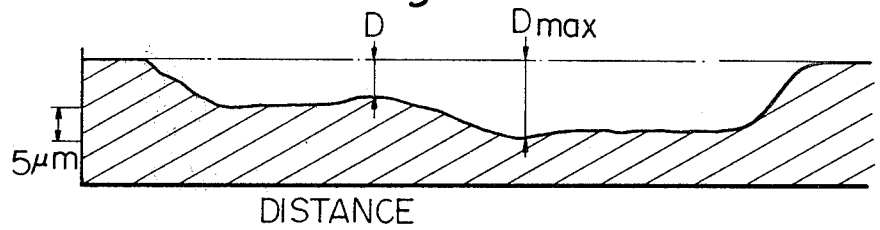
FIG. 4 is a side sectional view of the tape contacting face of the sample No. 9 (conventional) in Example 2.

For comparison, permalloy alloy blocks were prepared in accordance with the conventional casting process and were formed into permalloy alloy laminae in a manner the same as preparation of the laminae in accordance with the present invention. Similar measurements were applied to samples No. 9 to No. 16 and the condition of the tape contacting face of the sample No. 9 after abrasion test is shown in FIG. 4. The compositions of the conventional samples No. 9 to 16 are equal to those of the samples No. 1 to 8 in accordance with the present invention.

TABLE 3

| Sample NO. | Initial magnetic permeability ($\mu_o$) | Coercive force Hc (A/m) | Saturated magnetic flux density $B_{10}$ (T) | Hardness (Hv) | Maximum abrasion depth $D_{max}$ ($\mu m$) | Category |
|---|---|---|---|---|---|---|
| | 80,000 | 0.8 | 0.74 | 156 | 1.3 | |
| | 80,000 | 1.2 | 0.70 | 140 | 1.7 | |
| | 120,000 | 0.8 | 0.59 | 210 | 0.1 | Present invention |
| | 50,000 | 2.0 | 0.57 | 200 | 0.2 | |
| | 30,000 | 3.2 | 0.51 | 230 | 0.25 | |
| | 2,000 | 9.6 | 1.35 | 140 | 0.9 | |
| | 4,000 | 7.2 | 1.28 | 150 | 0.4 | |
| | 2,000 | 8 | 0.53 | 130 | 0.4 | | results given in Table 2 clearly indicate that ...ment of the present invention in manufacturing ...netic head cores results in surprising rise in abra-...sistance. Under same condition of abrasion, the ...m abrasion depth for the samples of the present ...n is one-tenth or smaller than that for the sam-...he conventional art. Even in the case of sample ...hich contains no additional component for im-...nt of properties, its abrasion resistance is by far ...an the conventional samples containing such ...nal component or components. No particular ...in magnetic properties is recognized. High ...esistance could be obtained either when Ni ...etallic powders were used (Example 1) or ...e alloy powder was used (Example 2). ...ve-described improvement in abrasion resis-...eved to accrue from the fact that surfaces of ...ticles are a bit oxidized to form shells during compaction and sintering, and the oxidized shells are smashed into fine pieces during rolling of the sintered block which are uniformly dispersed into the body of the lamina and contributes to improvement in abrasion resistance. Due to this internal dispersion, the fine pieces of metal oxides are not reduced during annealing within a hydrogen atmosphere to be applied after stamping of the lamina.

EXAMPLE 3

Each of the alloys having the compositions shown in Table 4 was molten by means of vacuum melting process and powdered by means of hydro-atomization within a mixture of air with argon gass.

TABLE 4

| Sample NO. | Composition (in % by weight) | | | | | | | | | |
|---|---|---|---|---|---|---|---|---|---|---|
| | Ni | Fe | Mo | Cu | Al | Ti | Mg | Ca | Ce | Be |
| 25 | 78 | 13 | 4.0 | 4.5 | | | | | | |
| 26 | 78 | 13 | 3.5 | 4.0 | 0.5 | | | | | |
| 27 | 78 | 13 | 4.0 | 4.9 | 1.5 | | | | | |
| 28 | 78 | 13 | 3.0 | 4.0 | | 0.1 | | | | |
| 29 | 78 | 13 | 4.0 | 4.9 | | 2.0 | | | | |
| 30 | 78 | 13 | 3.0 | 4.0 | | | 0.1 | | | |
| 31 | 78 | 13 | 4.0 | 4.9 | | | 2.0 | | | |
| 32 | 78 | 13 | 3.0 | 4.0 | | | | 0.01 | | |
| 33 | 78 | 13 | 4.0 | 4.9 | | | | 2.0 | | |
| 34 | 78 | 13 | 3.0 | 4.0 | | | | | 0.1 | 1.0 |
| 35 | 78 | 13 | 4.0 | 5.0 | | | | | | |
| 36 | 78 | 13 | 4.0 | 4.0 | | | | | | |
| 37 | 78 | 13 | 4.0 | 4.97 | 0.05 | 0.02 | | | | 0.001 |
| 38 | 78 | 13 | 4.0 | 4.899 | | 0.05 | | | | 1.0 |
| 39 | 78 | 13 | 4.0 | 4.97 | 0.02 | | 0.05 | 0.05 | | 0.001 |
| 40 | 45 | 53 | 2.0 | | | | | | | |
| 41 | 45 | 53 | 1.98 | | 0.02 | | | | | |
| 42 | 45 | 52 | 2.0 | | | 0.02 | | | | 1.0 |
| 43 | 45 | 53 | 1.98 | | | | 0.02 | | | |
| 44 | 45 | 52 | 2.0 | | | | | | | 1.0 |

Each material powder was then placed within a rubber casing for hydrostatic compaction at about 15,000 kg/cm² for about 200 sec, thereby obtaining a compressed block of 50×50×100 mm. The compressed block was subjected to sintering at 1,300° C. for 5 hours within a vacuum atmosphere and the sintered block was subjected to alternate application of cold rolling of 50% and interim annealing at 800° C. for 2 hours until a permalloy alloy lumina of 0.3 mm thickness is obtained.

Test pieces and magnetic head core samples were prepared and measurements were carried out as in Example 1. The results of the measurements are given in Table 5.

TABLE 5

| Sample NO. | Magnetic properties | | | Abrasion μm |
|---|---|---|---|---|
| | Initial magnetic permeability $\mu_o$ | Coercive force Hc (A/m) | Saturated magnetic flux density $B_{10}$ (T) | |
| 25 | 15,000 | 1.84 | 0.61 | 11 |
| 26 | 11,000 | 2.08 | 0.55 | 9 |
| 27 | 38,000 | 1.92 | 0.56 | 12 |
| 28 | 10,000 | 3.12 | 0.48 | 7.2 |
| 29 | 54,000 | 2.00 | 0.68 | 10 |
| 30 | 8,000 | 3.28 | 0.56 | 7.1 |
| 31 | 42,000 | 0.96 | 0.71 | 21 |
| 32 | 6,000 | 3.04 | 0.61 | 5.6 |
| 33 | 18,000 | 3.2 | 0.60 | 13 |
| 34 | 6,000 | 4.0 | 0.50 | 5.5 |
| 35 | 38,000 | 1.92 | 0.59 | 12 |
| 36 | 10,000 | 4.0 | 0.53 | 7.2 |
| 37 | 43,000 | 1.76 | 0.69 | 9.3 |
| 38 | 32,000 | 1.92 | 0.69 | 8.6 |
| 39 | 21,000 | 1.44 | 0.69 | 10.3 |
| 40 | 4,000 | 8.8 | 13.3 | 4.1 |
| 41 | 2,500 | 12 | 13.3 | 3.5 |
| 42 | 1,200 | 14.4 | 13.0 | 2.8 |
| 43 | 3,000 | 12 | 13.0 | 4.0 |
| 44 | 1,800 | 16 | 12.6 | 3.9 |

For comparison, material powder samples No. 45 to 64 having compositions same as those of samples No. 25 to 44, respectively in the listed order, were formed into permalloy alloy cast blocks by means of conventional vacuum melting process. Each cast block was rolled into a permalloy alloy lamina of 0.3 mm thickness which was then subjected to tests similar to those applied to samples No. 25 to 44. The results are given in Table 6.

The extent of oxidization by the above-described atomization applied to samples No. 25 to 44 was from 200 to 3,000 ppm. for each.

TABLE 6

| Sample NO. | Magnetic properties | | | Abrasion μm |
|---|---|---|---|---|
| | Initial magnetic permeability | Coercive force Hc (A/m) | Saturated magnetic flux density $B_{10}$ (T) | |
| 45 | 20,000 | 1.6 | 0.62 | 69 |
| 46 | 15,000 | 2.4 | 0.58 | 63 |
| 47 | 41,000 | 1.44 | 0.56 | 71 |
| 48 | 13,000 | 2.8 | 0.49 | 32 |
| 49 | 70,000 | 1.6 | 0.68 | 65 |
| 50 | 14,000 | 3.04 | 0.59 | 41 |
| 51 | 85,000 | 0.72 | 0.72 | 85 |
| 52 | 13,000 | 2.64 | 0.64 | 55 |
| 53 | 21,000 | 2.8 | 0.62 | 73 |
| 54 | 12,000 | 3.6 | 0.52 | 42 |
| 55 | 51,000 | 1.68 | 0.61 | 81 |
| 56 | 12,000 | 3.52 | 0.54 | 62 |
| 57 | 52,000 | 0.96 | 0.70 | 72 |
| 58 | 55,000 | 0.88 | 0.69 | 71 |
| 59 | 61,000 | 0.9 | 0.71 | 82 |
| 60 | 5,000 | 8.0 | 1.35 | 43 |
| 61 | 3,000 | 9.6 | 1.33 | 41 |
| 62 | 1,500 | 12 | 1.30 | 35 |
| 63 | 4,000 | 10.4 | 1.33 | 46 |
| 64 | 2,100 | 14.4 | 1.28 | 32 |

The results given in Tables 5 and 6 clearly indicate that addition of an easily oxidizable element or elements in combination with preparation of the material powder by means of atomization greatly improves abrasion resistance of the product.

EXAMPLE 4

Each of the nine material powder samples No. 65 to 73 having compositions shown in Table 7 was molten by vacuum melting process and powdered by means of hydro-atomization within a mixture of air with argon gass.

TABLE 7

| Sample NO. | Composition (in % by weight) | | | | | | | | |
|---|---|---|---|---|---|---|---|---|---|
| | Ni | Fe | Mo | Cu | Al | Ti | Mg | Ca | Be |
| 65 | 78 | 13 | 4 | 4.5 | 0.5 | | | | |
| 66 | 78 | 13 | 4 | 4.9 | | 0.1 | | | |
| 67 | 78 | 13 | 3.0 | 4.0 | | 2.0 | | | |
| 68 | 78 | 13 | 4 | 4.9 | | | | 0.01 | |
| 69 | 78 | 13 | 3.0 | 4.0 | | | 2.0 | | |
| 70 | 78 | 13 | 4 | 5.0 | | | | | 0.001 |
| 71 | 78 | 13 | 4 | 4.889 | | 0.05 | | 0.05 | 0.001 |
| 72 | 78 | 13 | 4 | 4.97 | 0.02 | | 0.05 | | |
| 73 | 45 | 52 | 2.0 | | | 1.0 | | | |

Each material powder was then subjected to reduction at 400° C. for 10 hours within a hydrogen atmosphere of −70° C. dew point. Ring shaped test piece and a head core sample was prepared in a manner similar to that in Example 1. Measurements of various properties were also carried out just like in Example 1. The obtained results are given in Table 8.

The amounts of oxygen possessed by each atomized material powder before and after the reduction were measured and the results are given in Table 10.

TABLE 8

| Sample NO. | Magnetic properties | | | Abrasion μm |
|---|---|---|---|---|
| | Initial magnetic permeability | Coercive force Hc (A/m) | Saturated magnetic flux density $B_{10}$ (T) | |
| 65 | 20,000 | 1.20 | 0.60 | 13 |
| 66 | 40,000 | 1.60 | 0.56 | 16 |
| 67 | 13,500 | 2.88 | 0.48 | 8.0 |
| 68 | 61,000 | 0.80 | 0.72 | 23 |
| 69 | 11,000 | 2.80 | 0.63 | 6.2 |
| 70 | 48,000 | 1.76 | 0.59 | 14 |
| 71 | 50,000 | 1.12 | 0.69 | 9.4 |
| 72 | 46,000 | 1.08 | 0.70 | 12.6 |
| 73 | 2,100 | 14.4 | 1.26 | 4.0 |

For comparison, material powder samples No. 74 to 82 having compositions same as those of samples 65 to 74, respectively in the listed order, were formed into permalloy alloy cast blocks by means of conventional vacuum melting process.

Each cast was rolled into a permalloy alloy lamina of 0.3 mm thickness which was then subjected to tests similar to those applied to samples No. 65 to 73. The results are give in Table 9.

TABLE 9

| Sample NO. | magnetic properties | | | Abrasion μm |
|---|---|---|---|---|
| | Initial magnetic permeability $\mu_o$ | Coercive force Hc (A/m) | Saturated magnetic flux density $B_{10}$ (T) | |
| 74 | 20,000 | 1.60 | 0.62 | 69 |
| 75 | 41,000 | 1.44 | 0.56 | 71 |
| 76 | 13,000 | 2.8 | 0.49 | 32 |
| 77 | 85,000 | 0.72 | 0.72 | 85 |
| 78 | 13,000 | 2.64 | 0.64 | 55 |
| 79 | 51,000 | 1.68 | 0.61 | 81 |
| 80 | 55,000 | 0.88 | 0.69 | 71 |
| 81 | 61,000 | 0.9 | 0.71 | 82 |
| 82 | 2,100 | 14.4 | 1.28 | 32 |

TABLE 10

| Sample NO. | Amount of oxygen in ppm. | |
|---|---|---|
| | After atomization (before reduction) | After reduction |
| 65 | 2,100 | 600 |
| 66 | 1,600 | 400 |
| 67 | 2,600 | 480 |
| 68 | 800 | 300 |
| 69 | 3,000 | 800 |
| 70 | 860 | 260 |
| 71 | 1,100 | 340 |
| 72 | 1,200 | 410 |
| 73 | 2,100 | 1,00 |

The results given in Tables 8 and 9 clearly indicate that introduction of the annealing within a reducing atmosphere into preparation of the material powders greatly contributes to improvement in abrasion resistance of the products. Further, the results given in Table 10 indicate remarkable decrease in content of oxygen which resulted from annealing in a reducing atmosphere.

EXAMPLE 5

Figure 5:
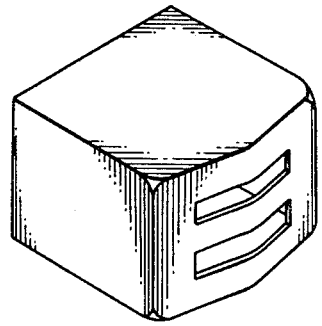
FIG. 5 is a perspective view of the shield casing test pieces used in Example 5.

Permalloy alloy laminae were prepared in a manner same as that in Example 1 while using the material powder samples No. 1 to 8. Ring-shaped test pieces were stamped out of the laminae. Likewise shield casing test pieces such as shown in FIG. 5 were formed of the laminae. They were all subjected to tests and measurements substantially similar to those employed in Example 1. The results are given in Table 11.

TABLE 11

| Sample NO. | Maximum abrasion depth $D_{max}$ in $\mu$m | Category |
|---|---|---|
| 1 | 1.1 | Present invention |
| 2 | 1.8 | |
| 3 | 0.2 | |
| 4 | 0.2 | |
| 5 | 0.4 | |
| 6 | 0.8 | |
| 7 | 0.3 | |
| 8 | 0.3 | |
| 9 | 14 | Conventional |
| 10 | 19 | |
| 11 | 3 | |
| 12 | 3 | |
| 13 | 5 | |
| 14 | 11 | |
| 15 | 10 | |
| 16 | 6 | |

For comparison, like shield casing test pieces were prepared using the material powder samples No. 9 to 16 in Example 1 by means of the conventional melt casting process and subjected to similar tests and measurements. The results obtained are given in Table 11, also.

EXAMPLE 6

Like shield casing test pieces were prepared in a manner same as that in Example 2 while using the material powder samples No. 17 to 24. Test pieces were all subjected to tests and measurements substantially similar to those employed in Example 5. The results obtained are given in Table 12.

TABLE 12

| Sample No. | Maximum abrasion depth $D_{max}$ in $\mu$m |
|---|---|
| 17 | 1.2 |
| 18 | 1.7 |
| 19 | 0.1 |
| 20 | 0.2 |
| 21 | 0.2 |
| 22 | 1.0 |
| 23 | 0.5 |
| 24 | 0.4 |

The results given in the Tables clearly indicate advantages accruing from the present invention.

EXAMPLE 7

Like shield casing test pieces were prepared in a manner same as that in Example 3 while using the material powder samples No. 25 to 44 (see Table 4). Test pieces were all subjected to tests and measurements substantially similar to those employed in Example 5. The results obtained are given in Table 13.

For comparison, like shield casing test pieces were prepared by means of the conventional process described in Example 3 whilst using the material powder samples having compositions same as those of samples No. 25 to 44. The results of the tests and measurements are given in Table 13.

TABLE 13

| Sample NO. | maximum abrasion depth $D_{max}$ in $\mu$m | |
|---|---|---|
| | Present invention | Conventional |
| 25 | 12 | 71 |
| 26 | 9 | 64 |
| 27 | 12 | 73 |
| 28 | 8 | 32 |
| 29 | 11 | 64 |
| 30 | 7 | 42 |
| 31 | 20 | 87 |
| 32 | 5.2 | 57 |
| 33 | 12 | 72 |
| 34 | 5.2 | 41 |
| 35 | 13 | 82 |
| 36 | 7.4 | 64 |
| 37 | 9.1 | 72 |
| 38 | 8.8 | 72 |
| 39 | 11 | 84 |
| 40 | 4.2 | 43 |
| 41 | 3.7 | 40 |
| 42 | 2.8 | 36 |
| 43 | 4.2 | 46 |
| 44 | 3.8 | 33 |

It is clearly noted from the results given in Table 13 that employment of the present invention greatly improves abrasion resistance of the products.

EXAMPLE 8

Like shield casing test pieces were prepared in a manner same as that in Example 4 whilst using the material powder samples No. 65 to 74 (see Table 7). Test pieces were all subjected to tests and measurements substantially similar to those employed in Example 5. The results obtained are given in Table 14.

For comparison, like shield casing test pieces were prepared by means of the conventional process described in Example 4 while using the material powder samples having compositions same as those of samples 65 to 73. The results of the tests and measurements are given in Table 14.

TABLE 14

| Sample NO. | Maximum abrasion depth $D_{max}$ in μm | |
|---|---|---|
| | Present invention | Conventional |
| 65 | 12 | 71 |
| 66 | 15 | 73 |
| 67 | 8.0 | 32 |
| 68 | 22 | 87 |
| 69 | 6.3 | 57 |
| 70 | 13 | 82 |
| 71 | 9.2 | 72 |
| 72 | 12.2 | 84 |
| 73 | 4.1 | 33 |

The results given in Table 14 clearly indicates advantage of the present invention over the conventional method.

EXAMPLE 9

Material powder sample No. 83 to 101 having the compositions shown in Table 15 were used while preparation of test pieces and measurement of their properties were carried out just as in Example 3. The results obtained are shown in Table 16 and FIGS. 6 through 11.

Figure 6:
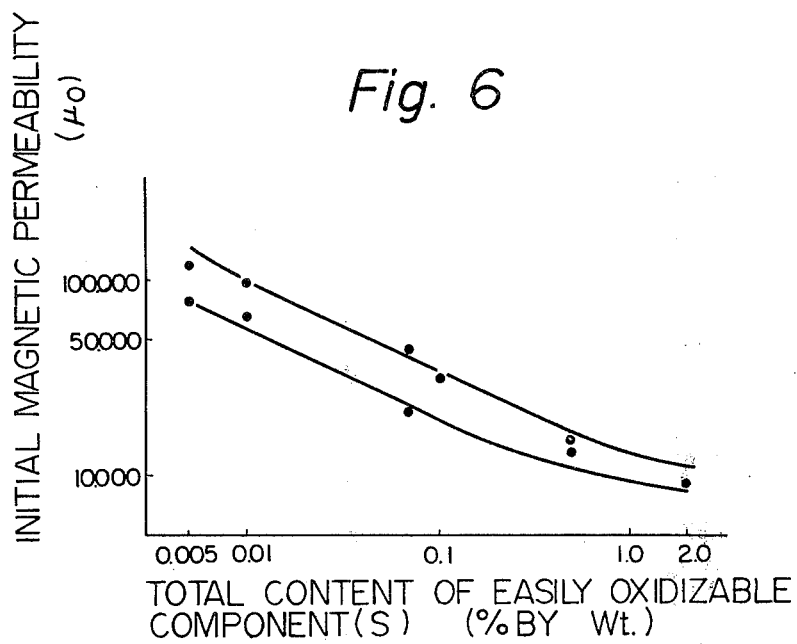
FIGS. 6 through 17 are graphs for showing results obtained in Examples 9 and 10.

In FIG. 6, change in initial magnetic permeability $\mu_o$ (on the ordinate) is shown relative to change in total content in % by weight of the easily oxidizable element or elements (on the abscissa). Values are given in logarithm scale.

TABLE 15

| Sample No. | Content (% by weight) | | | | | | | | | |
|---|---|---|---|---|---|---|---|---|---|---|
| | Ni | Fe | Mo | Cu | Al | Ti | Mg | Ca | Ce | Be |
| 83 | 78 | 13 | 4.0 | 4.995 | 0.005 | | | | | |
| 84 | 78 | 13 | 4.0 | 4.99 | 0.01 | | | | | |
| 85 | 78 | 13 | 4.0 | 4.9 | 0.1 | | | | | |
| 86 | 78 | 13 | 4.0 | 4.995 | | 0.005 | | | | |
| 87 | 78 | 13 | 4.0 | 4.99 | | 0.01 | | | | |
| 88 | 78 | 13 | 3.5 | 4.0 | | 1.5 | | | | |
| 89 | 78 | 13 | 4.0 | 4.99 | | | 0.01 | | | |
| 90 | 78 | 12.5 | 3.0 | 4.0 | | | 2.5 | | | |
| 91 | 78 | 13 | 4.0 | 4.993 | | | | 0.007 | | |
| 92 | 78 | 13 | 4.0 | 4.9 | | | | 0.1 | | |
| 93 | 78 | 12.0 | 3.0 | 4.0 | | | | 3.0 | | |
| 94 | 78 | 13 | 4.0 | 4.995 | 0.002 | 0.003 | | | | |
| 95 | 78 | 13 | 4.0 | 4.995 | 0.003 | | 0.002 | | | |
| 96 | 78 | 13 | 4.0 | 4.99 | 0.005 | 0.005 | | | | |
| 97 | 78 | 13 | 4.0 | 4.99 | 0.005 | | 0.005 | | | |
| 98 | 78 | 13 | 4.0 | 4.95 | 0.025 | | | | 0.025 | |
| 99 | 78 | 13 | 4.0 | 4.95 | | 0.025 | | 0.025 | | |
| 100 | 78 | 13 | 3.0 | 4.0 | 0.5 | 0.5 | 0.5 | 0.5 | | |
| 101 | 78 | 13 | 3.0 | 4.0 | | 0.5 | 0.5 | 0.5 | 0.5 | |

TABLE 16

| Sample No. | Initial magnetic permeability ($\mu_o$) | Coercive force Hc (A/m) | Saturated magnetic flux density $B_{10}$ (T) | maximum abrasion depth $D_{max}$ (μm) |
|---|---|---|---|---|
| 83 | 57,500 | 0.88 | 0.70 | 27.2 |
| 84 | 44,500 | 1.02 | 0.66 | 22.3 |
| 85 | 23,000 | 1.44 | 0.63 | 15.0 |
| 86 | 72,000 | 1.00 | 0.70 | 26.2 |
| 87 | 70,000 | 1.02 | 0.62 | 20.2 |
| 88 | 10,000 | 2.22 | 0.54 | 7.2 |
| 89 | 65,500 | 1.20 | 0.70 | 21.3 |
| 90 | 6,500 | 3.55 | 0.54 | 7.0 |
| 91 | 52,000 | 0.81 | 0.72 | 25.1 |
| 92 | 19,000 | 2.20 | 0.65 | 11.3 |
| 93 | 5,000 | 4.10 | 0.58 | 5.3 |
| 94 | 120,000 | 0.80 | 0.72 | 24.0 |
| 95 | 77,000 | 0.82 | 0.70 | 19.8 |
| 96 | 98,000 | 0.82 | 0.69 | 16.5 |
| 97 | 64,000 | 0.92 | 0.69 | 14.0 |
| 98 | 15,500 | 2.30 | 0.60 | 5.8 |
| 99 | 13,000 | 2.20 | 0.62 | 5.0 |
| 100 | 11,000 | 2.56 | 0.61 | 4.0 |
| 101 | 8,000 | 3.11 | 0.59 | 3.0 |

Figure 7:
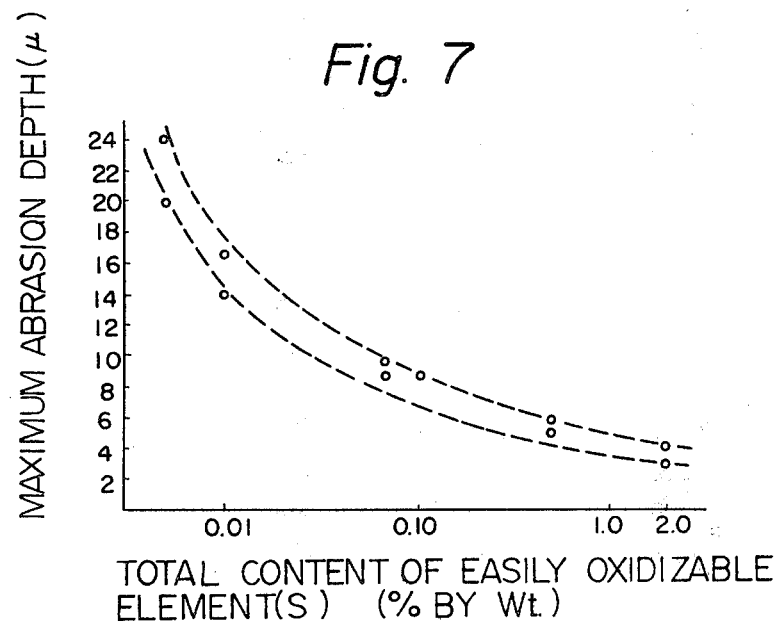

FIG. 7 shows like change in maximum abrasion depth in μm. Increase in content of the easily oxidizable element or elements clearly contributes to fortification of the products.

Figure 8:
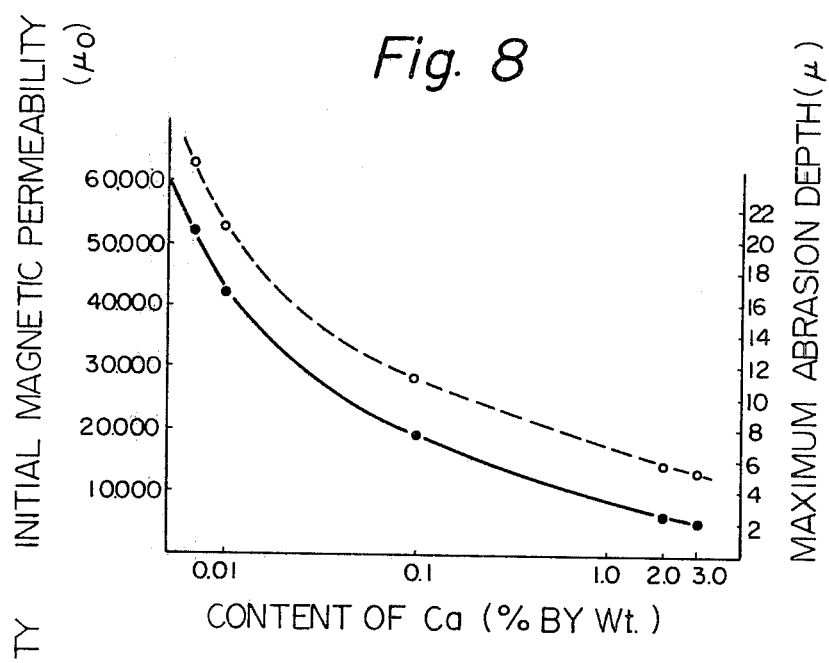
Figure 9:
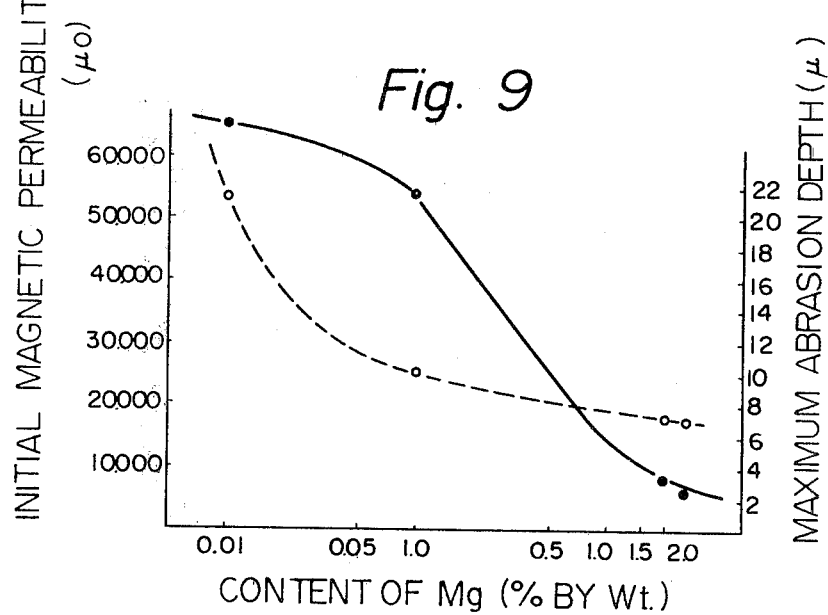
Figure 10:
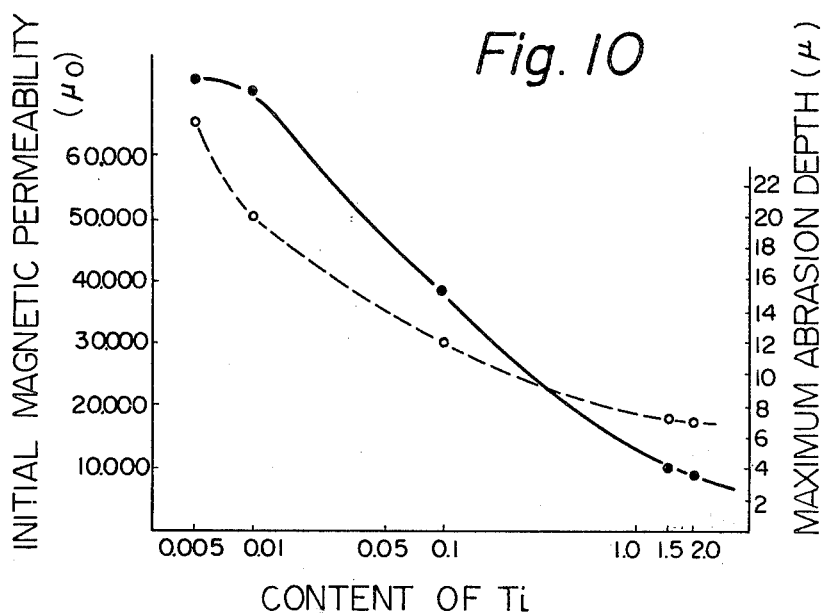
Figure 11:
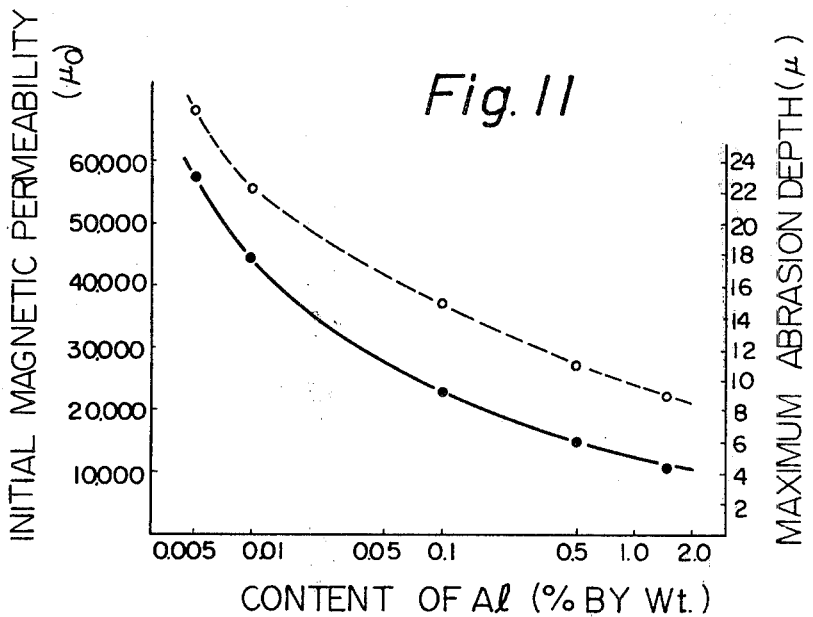

Changes in initial magnetic permeability (solid curve) and maximum abrasion depth (dotted curve) are shown in FIG. 8 with respect to change in content of Ca. Like changes are shown in FIGS. 9, 10 and 11 for Mg, Ti and Al, respectively.

EXAMPLE 10

The material powder samples No. 83 to 86, 92 and 93 used in Example 9 and material samples No. 102 to 114 having the compositions shown in Table 17 were used while preparation of test pieces and measurement of their properties were carried out just as in Example 4. The results obtained are shown in Table 18 and FIGS. 12 to 17, respectively.

TABLE 17

| Sample No. | Content (% by weight) | | | | | | | | | |
|---|---|---|---|---|---|---|---|---|---|---|
| | Ni | Fe | Mo | Cu | Al | Ti | Mg | Ca | Ce | Be |
| 102 | 78 | 13 | 3.0 | 4.0 | 2.0 | | | | | |
| 103 | 78 | 13 | 4.0 | 4.98 | | 0.02 | | | | |
| 104 | 78 | 13 | 4.0 | 4.5 | | 0.5 | | | | |
| 105 | 78 | 13 | 4.0 | 4.995 | | | | | 0.05 | |
| 106 | 78 | 13 | 4.0 | 4.0 | | | | | 1.0 | |
| 107 | 78 | 13 | 4.0 | 4.99 | | | | | | 0.01 |
| 108 | 78 | 13 | 4.0 | 4.9 | | | | | | 0.10 |
| 109 | 78 | 13 | 4.0 | 4.0 | | | | | | 1.0 |
| 110 | 78 | 13 | 3.0 | 4.0 | | | | | | 2.0 |
| 111 | 78 | 13 | 4.0 | 4.994 | 0.003 | 0.003 | | | | |
| 112 | 78 | 13 | 4.0 | 4.98 | 0.005 | 0.005 | 0.005 | 0.005 | | |
| 113 | 78 | 13 | 4.0 | 4.0 | 0.5 | 0.2 | 0.5 | | | 0.3 |
| 114 | 78 | 13 | 3.0 | 4.0 | 1.0 | 0.5 | 1.0 | 0.5 | | |

TABLE 18

| Sample No. | Initial magnetic permeability ($\mu_o$) | Coercive force Hc (A/m) | Saturated magnetic flux density $B_{10}$ (T) | maximum abrasion depth $D_{max}$ (μm) |
|---|---|---|---|---|
| 83 | 65,000 | 0.92 | 0.70 | 27.3 |
| 84 | 58,000 | 0.92 | 0.70 | 21.5 |
| 85 | 31,500 | 1.10 | 0.62 | 13.4 |
| 86 | 70,000 | 0.82 | 0.72 | 25.3 |
| 92 | 40,000 | 1.12 | 0.68 | 12.7 |
| 93 | 7,500 | 3.20 | 0.60 | 4.0 |
| 102 | 12,500 | 1.51 | 0.60 | 10.0 |
| 103 | 67,500 | 1.20 | 0.70 | 21.8 |
| 104 | 32,500 | 2.20 | 0.54 | 9.0 |
| 105 | 67,000 | 0.80 | 0.72 | 30.0 |
| 106 | 16,000 | 2.10 | 0.65 | 8.1 |
| 107 | 70,000 | 0.81 | 0.70 | 20.5 |
| 108 | 65,000 | 0.92 | 0.68 | 9.5 |
| 109 | 42,000 | 1.21 | 0.65 | 5.5 |
| 110 | 18,000 | 2.10 | 0.61 | 5.0 |
| 111 | 100,000 | 0.76 | 0.71 | 22.3 |
| 112 | 75,000 | 0.85 | 0.70 | 15.0 |
| 113 | 8,000 | 2.25 | 0.65 | 6.5 |
| 114 | 6,000 | 2.41 | 0.58 | 3.0 |

Figure 12:
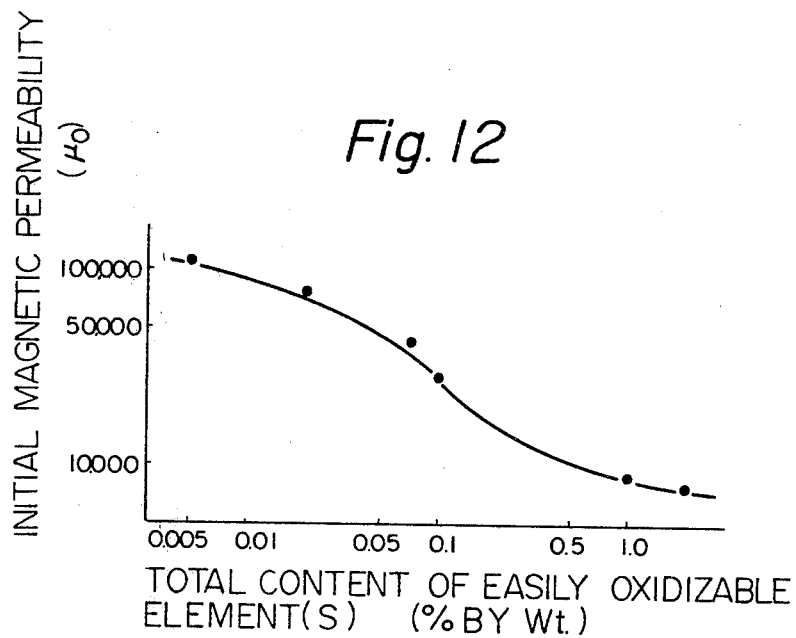

In FIG. 12, change in initial magnetic permeability $\mu_0$ (on the ordinate) is shown relative to change in total content in % by weight of the easily oxidizable element or elements (on the abscissa). Values are given in logarithm scale.

Figure 13:
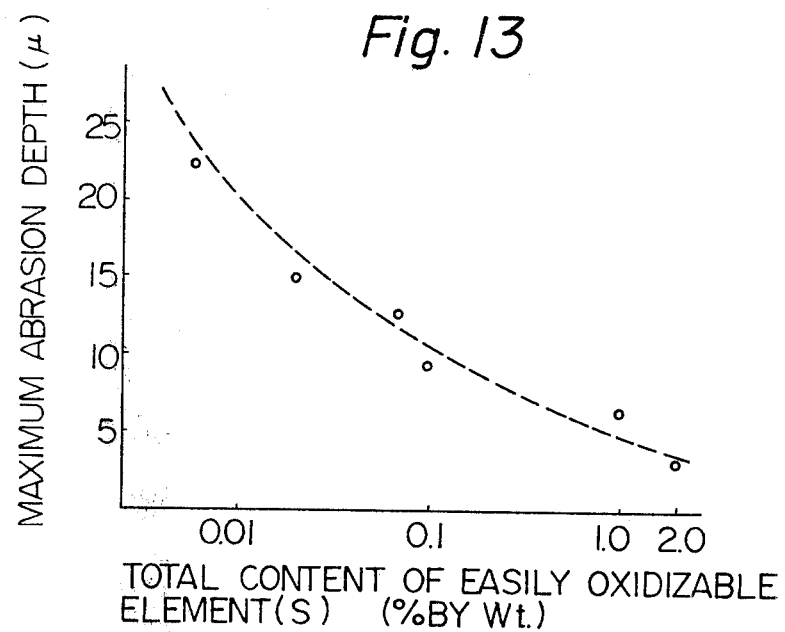

FIG. 13 shows like change in maximum abrasion depth in $\mu m$. Increase in content of the easily oxidizable element or elements clearly fortifies product against abrasion.

Figure 14:
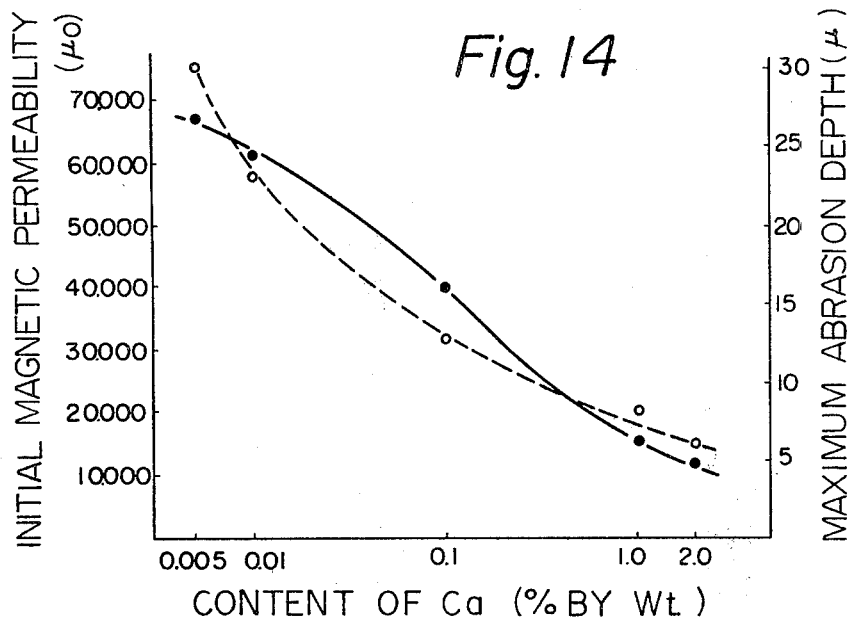
Figure 15:
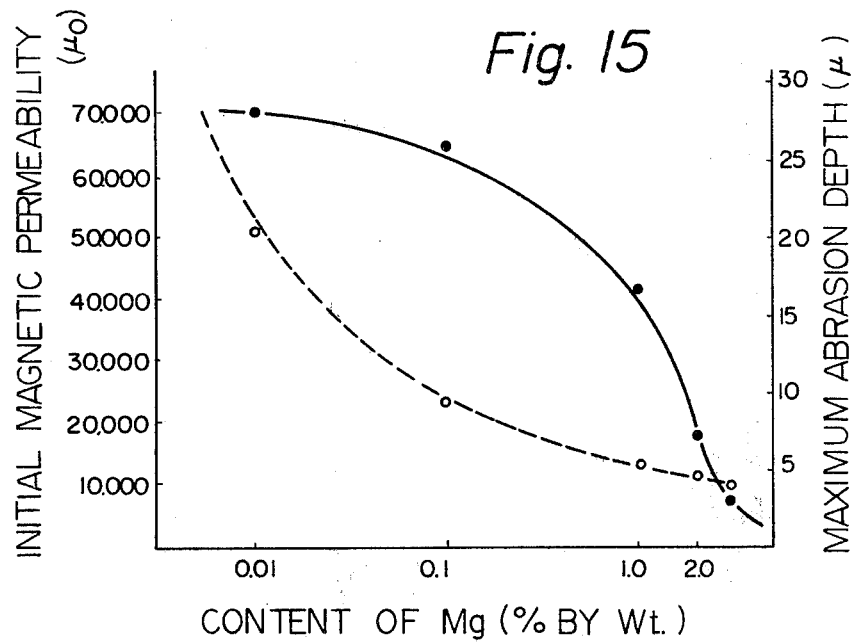
Figure 16:
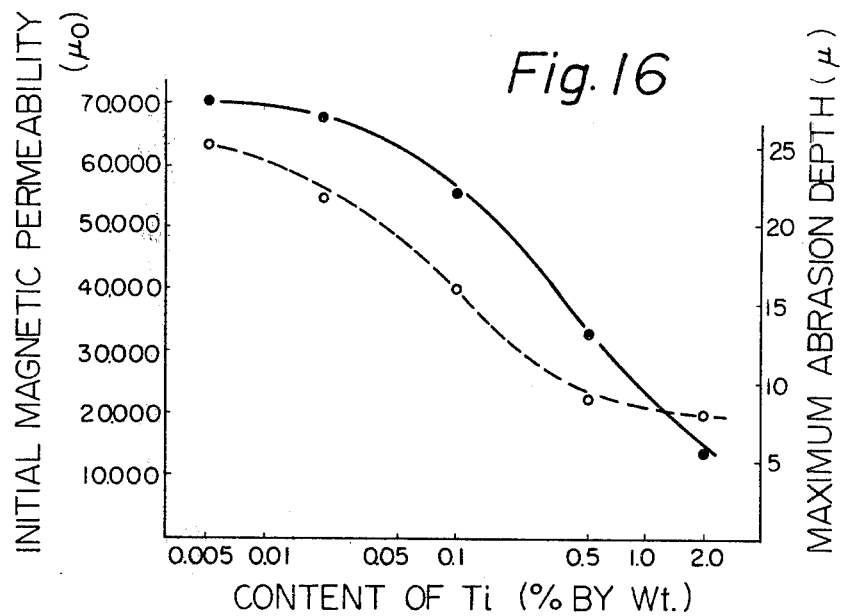
Figure 17:
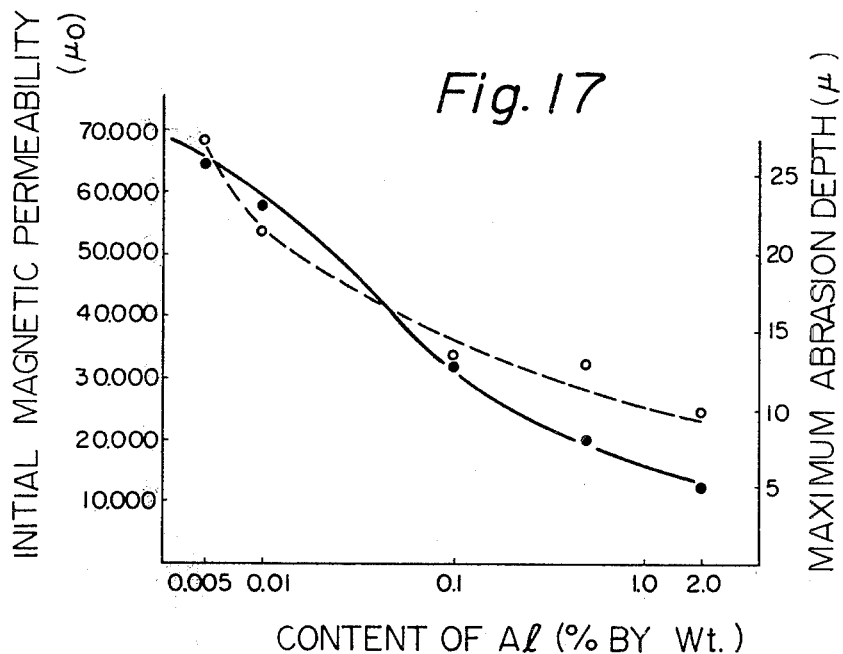

Changes in initial magnetic permeability (solid curve) and maximum abrasion depth (dotted curve) are shown in FIG. 14 with respect to change in content of Ca. Like changes are shown in FIGS. 15, 16 and 17 for Mg, Ti and Al, respectively.

We claim:

1. A method for manufacturing components for magnetic heads comprising
   preparing powder material of a permalloy alloy composition,
   compacting said powder material into a compressed block,
   sintering said compressed block at a temperature of at least 900° C. for at least one hour within a vacuum, hydrogen or inert atmosphere to form a sintered block,
   rolling said sintered block into a lamina, and forming said components from said lamina, thereby substantially raising abrasion resistance without lowering magnetic properties of said components.

2. A method as claimed in claim 1 in which said preparing includes
   adding to a base material of a permalloy alloy composition at least one element chosen from a group consisting of 0.5 to 14.0% by weight of Mo, 0.1 to 20% by weight of Cu, 0.1 to 10% by weight of Cr, 0.1 to 15% by weight of Nb, 0.1 to 10% by weight of Ti, 0.1 to 8.0% by weight of V, 0.1 to 8% by weight of Si, 0.01 to 5% by weight of Al, 0.1 to 8% by weight of W, 0.1 to 15% by weight of Ta, 0.01 to 15% by weight of Mn, 0.1 to 5% by weight of Co, 0.005 to 5% by weight of Y, 0.005 to 5% by weight of Ce, 0.005 to 5% by weight of La and 0.005 to 5% by weight of Sm.

3. A method as claimed in claim 1 in which
   said compacting is carried out by hydrostatic compaction at a pressure from 4,000 to 20,000 Kg./cm$^2$ for 2 to 300 seconds.

4. A method as claimed in claim 1 in which
   said heating is carried out in a vacuum atmosphere.

5. A method as claimed in claim 4 in which
   the degree of vacuum is $10^{-2}$ Torr. or lower.

6. A method as claimed in claim 1 in which
   said heating is carried out within a reducing gas atmosphere.

7. A method as claimed in claim 1 in which
   said heating is carried out within an inert gas atmosphere.

8. A method as claimed in claim 6 or 7 in which
   the dew point of said gas is $-20°$ C. or lower.

9. A method as claimed in claim 1 in which
   said heating is carried out at a temperature in a range from 900° to 1,430° C.

10. A method as claimed in claim 1 in which
    said heating is carried out for a period in a range from 1 to 20 hours.

11. A method as claimed in claim 1 in which
    said rolling includes alternate application of cold rolling of from 30 to 70% and interim annealing at a temperature in a range from 750° to 850° C.

12. A method as claimed in claim 1 in which said preparing includes
    adding to a base material of a permalloy composition at least one easily oxidizable element, and
    powdering by means of atomization.

13. A method as claimed in claim 12 in which
    said easily oxidizable element is chosen from a group consisting of 0.005 to 2% by weight of Al, 0.005 to 1.5% by weight of Ti, 0.01 to 2% by weight of Mg, 0.01 to 2% by weight of Ca, 0.005 to 1.0% by weight of Ce and 0.001 to 1.0% by weight of Be.

14. A method as claimed in claim 12 in which
    said atomization is hydro-atomization.

15. A method as claimed in claim 12 in which
    said atomization is gas-atomization.

16. A method as claimed in claim 12 in which said preparing further includes
    annealing within a reducing atmosphere said powder material prepared by said atomization.

17. A method as claimed in claim 16 in which
    said annealing is carried out within a vacuum atmosphere having a degree of vacuum of $10^{-2}$ Torr. or lower.

18. A method as claimed in claim 16 in which said annealing is carried out within a hydrogen atmosphere having a dew point of $-30°$ C. or lower.

19. A method as claimed in claim 17 or 18 in which
    said annealing is carried out at a temperature in a range from 200° to 800° C.

20. A method as claimed in claim 17 or 18 in which
    said annealing is carried out for a period in a range from 0.5 to 20 hours.

* * * * *